(12) United States Patent
Cox

(10) Patent No.: US 8,473,149 B2
(45) Date of Patent: Jun. 25, 2013

(54) EVENT LOGGING METHOD AND DEVICE

(75) Inventor: Calvin Howard Cox, Mirfield (GB)

(73) Assignee: Cummins Turbo Technologies Limited, Huddersfield (GB)

(*) Notice: Subject to any disclaimer, the term of this patent is extended or adjusted under 35 U.S.C. 154(b) by 324 days.

(21) Appl. No.: 11/901,464

(22) Filed: Sep. 17, 2007

(65) Prior Publication Data

US 2008/0071443 A1    Mar. 20, 2008

Related U.S. Application Data

(63) Continuation of application No. PCT/GB2006/000532, filed on Feb. 16, 2006.

(51) Int. Cl.
*G07C 5/08* (2006.01)
*G01M 15/05* (2006.01)

(52) U.S. Cl.
CPC ............. *G07C 5/0841* (2013.01); *G01M 15/05* (2013.01)
USPC .......................................... 701/33.4; 701/102

(58) Field of Classification Search
USPC ................................. 701/29, 34, 35, 102, 114
See application file for complete search history.

(56) References Cited

U.S. PATENT DOCUMENTS

| | | | | |
|---|---|---|---|---|
| 3,946,364 A | * | 3/1976 | Codomo et al. ................... 701/3 |
| 4,063,539 A | * | 12/1977 | Gorille et al. ............ 123/406.52 |
| 4,125,894 A | * | 11/1978 | Cashel et al. ................. 701/123 |
| 4,271,402 A | * | 6/1981 | Kastura et al. ................. 340/459 |
| 4,608,638 A | * | 8/1986 | Tsikos ............................. 701/35 |
| 4,817,418 A | | 4/1989 | Asami et al. |
| 4,947,820 A | | 8/1990 | Kushi |
| 5,033,010 A | * | 7/1991 | Lawrence et al. ............ 701/31.4 |
| 5,276,619 A | | 1/1994 | Ohara et al. |
| 5,535,620 A | * | 7/1996 | Nichols ...................... 73/114.69 |
| 5,586,130 A | * | 12/1996 | Doyle ............................ 714/815 |
| 5,638,273 A | * | 6/1997 | Coiner et al. ................... 701/35 |
| 5,745,864 A | * | 4/1998 | Hosoe et al. .................... 701/35 |
| 5,795,161 A | * | 8/1998 | Vogel ............................ 434/350 |

(Continued)

FOREIGN PATENT DOCUMENTS

| | | |
|---|---|---|
| EP | 1162360 | 12/2001 |
| JP | 7-172251 | 11/1995 |
| JP | 2002-38982 A | 6/2002 |

OTHER PUBLICATIONS

International Preliminary Report on Patentability, PCT/GB2006/000532, Holset Engineering Company Limited, The International Bureau of WIPO, Geneva, Switzerland, Sep. 18, 2007.

(Continued)

*Primary Examiner* — Mark Hellner
*Assistant Examiner* — Ari M Diacou
(74) *Attorney, Agent, or Firm* — Krieg DeVault, LLP

(57) ABSTRACT

A method of logging information about events for an internal combustion engine having an ignition circuit, and an event logging device arranged to implement the method. The method comprises incrementing a current value of a counter (50) at a predetermined rate when the ignition circuit is turned on, detecting that an event has occurred (53), creating a new event record (54) having at least two fields, populating the fields within the new event record with information about the event (55), including at least an event type and the current value of the counter; and storing the new event record (57).

33 Claims, 3 Drawing Sheets

U.S. PATENT DOCUMENTS

| | | | | |
|---|---|---|---|---|
| 5,941,915 | A * | 8/1999 | Federle et al. | 701/1 |
| 6,006,157 | A * | 12/1999 | Dai et al. | 701/114 |
| 6,135,777 | A * | 10/2000 | Vogel | 434/350 |
| 6,243,630 | B1 * | 6/2001 | Oohara et al. | 701/33.4 |
| 6,347,276 | B1 * | 2/2002 | Avery, Jr. | 701/112 |
| 6,393,347 | B1 * | 5/2002 | Snyder et al. | 701/33.4 |
| 6,757,606 | B1 * | 6/2004 | Gonring | 701/103 |
| 6,766,243 | B1 * | 7/2004 | Haussmann et al. | 701/114 |
| 6,775,609 | B2 * | 8/2004 | Ozeki et al. | 701/114 |
| 6,795,759 | B2 * | 9/2004 | Doyle | 701/32.6 |
| 7,239,946 | B2 * | 7/2007 | Sowa | 701/31.4 |
| 7,640,539 | B2 * | 12/2009 | Alexander et al. | 717/130 |
| 2004/0083047 | A1 * | 4/2004 | Li et al. | 701/102 |
| 2005/0187681 | A1 * | 8/2005 | Suzuki et al. | 701/29 |
| 2007/0244614 | A1 * | 10/2007 | Nathanson | 701/35 |

OTHER PUBLICATIONS

Examination report, EP2006/0709769, Cummins Turbo Technologies Limited, European Patent Office, Jan. 27, 2010.

International Search Report, PCT/GB2006/000532, Holset Engineering Company Limited, European Patent Office, Apr. 27, 2006.

* cited by examiner

EVENT LOGGING METHOD AND DEVICE

The present application is a continuation of PCT/GB2006/000532 filed on Feb. 16, 2006 which claims the benefit of United Kingdom Patent Application No. GB0505359.0 filed Mar. 16, 2005, which are incorporated herein by reference.

The present invention relates to a method and device for logging events for an internal combustion engine. In particular, but not exclusively, the present invention relates to event logging for a variable geometry turbine of a turbocharger for an internal combustion engine. More particularly, the invention relates to event logging for an actuator assembly that displaces a moveable element of the turbine inlet passageway to vary the geometry thereof.

Turbochargers are well known devices for supplying air to the intake of an internal combustion engine at pressures above atmospheric (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the engine intake manifold. The turbocharger shaft is conventionally supported by journal and thrust bearings, including appropriate lubricating systems, located within a central bearing housing connected between the turbine and compressor wheel housing.

In known turbochargers, the turbine stage comprises a turbine chamber within which the turbine wheel is mounted, an annular inlet passageway arranged around the turbine chamber, an inlet arranged around the inlet passageway, and an outlet passageway extending from the turbine chamber. The passageways and chambers communicate such that pressurised exhaust gas admitted to the inlet chamber flows through the inlet passageway to the outlet passageway via the turbine chamber and rotates the turbine wheel.

Turbines may be of a fixed or variable geometry type. Variable geometry turbines differ from fixed geometry turbines in that the size of the inlet passageway can be varied to optimise exhaust gas flow velocities on to the turbine wheel over a range of mass flow rates so that the power output of the turbine can be varied to suit changing engine demands. For example, when the volume of exhaust gas being delivered to the turbine is relatively low, the velocity of the gas reaching the turbine wheel is maintained at a level that ensures efficient turbine operation by reducing the size of the annular inlet passageway.

In one common type of variable geometry turbine, one wall of the inlet passageway is defined by a moveable wall member, generally referred to as a nozzle ring. The position of the nozzle ring relative to a facing wall of the inlet passageway is adjustable to control the width of the inlet passageway. For instance, as gas flowing through the turbine decreases, the inlet passageway width may also be decreased to maintain gas velocity and optimise turbine output. A typical nozzle ring comprises a radially extending annular wall and inner and outer radially extending annular flanges. The annular flanges extend into an annular cavity defined in the turbine housing which cavity accommodates axial movement of the nozzle ring.

The nozzle ring may be provided with vanes that extend into the inlet passageway and through slots provided on the facing wall of the inlet passageway to accommodate movement of the moveable nozzle ring. Alternatively, vanes may extend from a fixed wall through slots provided in the nozzle ring. The nozzle ring is generally supported on rods extending parallel to the axis of rotation of the turbine wheel and is moved by an actuator, which axially displaces the rods.

Various forms of actuator are known for use with variable geometry turbines, including pneumatic, hydraulic and electric actuators, and each is typically mounted externally of the turbocharger housing and connected to the variable geometry system via appropriate transmission elements or linkages. The actuator is used to control the axial position of the moveable wall (e.g. the nozzle ring) relative to the facing wall of the inlet passageway. One example of such an actuator is an electric motor mounted to the turbocharger housing and connected via a gear transmission and mechanical linkage to the nozzle ring.

Control systems for controlling adjustments to the geometry of the variable geometry turbine are well established and usually form part of an engine management control system. Typically, an electrical control signal is sent by the control system to the actuator to displace the movable wall (or other element) of the variable geometry system. The control system, which includes a microprocessor and memory etc., receives signals relating to various sensed parameters of the engine such as, for example, engine speed, fuel rate, intake manifold pressure and exhaust manifold pressure, together with sensed parameters relating to the condition of the actuator such as, for example current position and its temperature. The signals are then processed to determine the desired position of the moveable wall at any particular time. It generates the appropriate electrical control signals to control the actuator and so regulate the exhaust gas flow velocity directed on to the turbine wheel. The change in gas flow in turn regulates the amount of compressed air that is fed into the inlet manifold of the engine by the turbocharger.

It is known to provide a device to detect and electrically log information about events, which are important for diagnostic analysis of potential fault conditions within an internal combustion engine as a whole. It is known to provide a clock signal to the device such that the time at which events occur can be recorded in order to aid diagnosis of faults. A clock signal typically comprises a pulsed input signal derived from an oscillator. However, a clock signal requires a continuous power supply in order to record the time at which events occur. It is often impractical or unduly expensive to provide a continuously powered clock signal to an event logging device within an internal combustion engine.

Event logging devices are known which continuously or periodically sample data and record this data in memory. However, continuous recording of data can result in a very large amount of information being recorded. Little of this information is likely to relate to events that are of use in diagnosing faults. Critical data is at risk of being overwritten by keeping the device active long after the critical event has occurred. Conversely, periodic sampling of signals runs the risk of critical transient events being missed. Another known technique of monitoring critical events is to count the occurrences of critical events over a period of time. Although this can give an indication of the severity of an undesirable condition there is no time context to indicate over what period these events occurred and how closely they were together.

It is an object of the present invention to obviate or mitigate the above, or other, disadvantages. In particular, it is an object of the present invention to provide a method and device for gathering information about events within an estimated time frame where no time reference (clock) signal is available. This data may be important for diagnostic fault analysis.

According to a first aspect of the present invention there is provided a method of logging information about events for an internal combustion engine having an ignition circuit, the method comprising the steps of: incrementing a current value of a counter at a predetermined rate only when the ignition circuit is turned on; detecting that an event has occurred; creating a new event record having at least two fields; populating the fields within the new event record with information about the event, including at least event type and the current value of the counter; and storing the new event record.

An advantage of the present invention is that information may be stored about events within an estimated time frame without requiring a continuously powered clock signal. Event logging thus only occurs from the point where the ignition circuit is on i.e. when the electrical circuit that controls ignition of the engine is powered up. The stored information can be of critical importance when analysing a fault within an internal combustion engine to discover the cause of the fault. Furthermore, as information is only stored when an event occurs, the volume of information that is stored is restricted to that which is useful for later analysis of engine performance and fault diagnosis.

It is to be understood that the term internal combustion engine is intended to cover diesel engines.

Preferably, the method further comprises the steps of storing the current value of the counter in a counter memory device and storing each event record in an event record memory device. More preferably, the or each memory device comprises a non-volatile memory device such that the stored contents of the or each memory device are not erased if a power supply to the or each memory device is disconnected.

The event record memory device may have a finite capacity to receive new event records. The method may further comprise the step of overwriting an oldest event record with the new event record once the finite capacity of the event record memory device is exceeded.

The method may further comprise the step of using a pointer in the event record memory device to point to the next sequential position after the new event record, for storing the next event record.

The internal combustion engine may comprise a turbocharger with a variable geometry turbine, the turbine being driven by exhaust gas delivery to the turbine inlet passage from an internal combustion engine exhaust manifold. The turbine may use a selectively moveable element to vary the geometry of an inlet passage of the turbine, the moveable element being displaceable by an actuator in response to electrical control signals. The actuator may be an electrical actuator.

Preferably, each event record has further fields and the step of populating the fields may further comprise populating the further fields with information about the event selected from a group including engine status, actuator temperature and actuator position.

The internal combustion engine may have an engine management control system that controls the implementation of the method. The engine management control system may comprise a microprocessor that controls the implementation of the method. The method may be implemented via a computer program stored in the engine management system.

Events may be selected from a group including an ignition circuit turning on, failure of an actuator to reach a desired position, excess current drawn by an actuator, failure of a Hall sensor within a turbine and failure of the internal combustion engine.

According to a second aspect of the present invention there is provided an event logging device for an internal combustion engine having an ignition circuit, the event logging system comprising: a counter arranged to increment at a predetermined rate only when the ignition circuit is turned on; means for detecting that an event has occurred; means for creating a new event record having at least two fields; means for populating the fields within the new event record with information about the event, including at least event type and the current value of the counter; and a memory for storing the new event record.

Preferably, the device is arranged to store the current value of the counter in a counter memory device and each event record in an event record memory device. More preferably, the or each memory device comprises a non-volatile memory device such that the stored contents of the or each memory device are not erased if a power supply to the or each memory device is disconnected.

The event record memory device may have a finite capacity to receive new event records, and be arranged to overwrite an oldest event record with the new event record once the finite capacity of the event record memory device is exceeded.

The device may be arranged to provide a pointer in the event record memory device to point to the next sequential position after the new event record, for storing the next event record.

The internal combustion engine may comprise a turbocharger with a variable geometry turbine, the turbine being driven by exhaust gas delivery to the turbine inlet passage from an internal combustion engine exhaust manifold. The turbine may use a selectively moveable element to vary the geometry of an inlet passage of the turbine, the moveable element being displaceable by an actuator in response to electrical control signals. The actuator may be an electrical actuator.

Preferably, each event record has further fields and the device is arranged to populate the further fields with information about the event selected from a group including engine status, actuator temperature and actuator position.

The internal combustion engine may have an engine management control system and the event logging device may form part of the engine management system. The engine management control system may comprise a microprocessor.

Preferably, events are selected from a group including an ignition circuit turning on, failure of an actuator to reach a desired position, excess current drawn by an actuator, failure of a Hall sensor within a turbine and failure of the internal combustion engine.

According to a third aspect of the present invention there is provided a powered vehicle having an internal combustion engine, comprising an event logging device as described above.

A specific embodiment of the invention will now be described, by way of example only, with reference to the accompanying drawings, in which.

Figure 1:
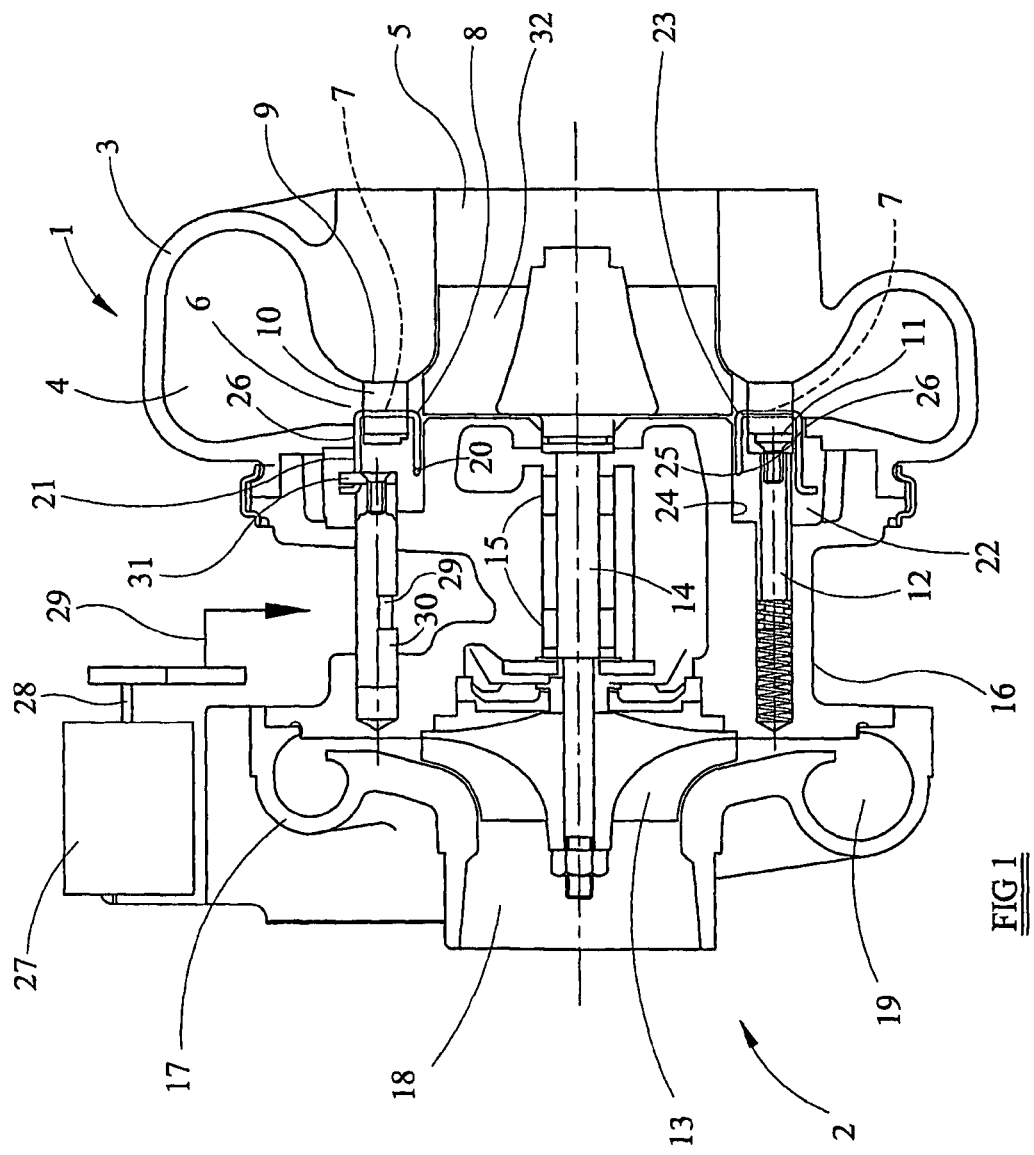
FIG. 1 is a cross-sectional illustration of a turbocharger with a variable geometry turbine in accordance with the present invention and shown with a schematic representation of an electrical actuator.

Referring now to FIG. 1 of the drawings, this illustrates a turbocharger of known general structure but which has a variable geometry turbine for which events can be logged in accordance with the invention.

The turbocharger comprises a turbine stage 1 and a compressor stage 2. The turbine stage 1 is a variable geometry turbine comprising a turbine housing 3 defining a volute or inlet chamber 4 to which exhaust gas from an internal combustion engine (not shown) is delivered. The exhaust gas flows from the inlet chamber 4 to an outlet passageway 5 via an annular inlet passageway 6 defined on one side by a radial wall 7 of a moveable annular member 8, referred to herein as a nozzle ring, and on the other side by a facing radial wall 9 of the housing 3. An array of nozzle vanes 10 extend through slots in the nozzle ring 8 across the inlet passageway 6 from a vane support ring 11 which is mounted on support pins 12. The arrangement is such that the degree to which the vanes 10 extend across the inlet passageway 6 is controllable independently of the nozzle ring 8 and will not be described in detail here.

Gas flowing from the inlet chamber 4 to the outlet passageway 5 passes over a turbine wheel 32 which as a result drives a compressor wheel 13 via turbocharger shaft 14 which rotates on bearing assemblies 15 located within a bearing housing 16 which connects the turbine housing 3 to a compressor housing 17. Rotation of the compressor wheel 13 draws in air through a compressor inlet 18, and delivers compressed air to the intake of the engine (not shown) via an outlet volute 19. It will be appreciated that the bearing housing also houses oil supply and seal arrangements, the details of which are not necessary for an understanding of the present invention.

The nozzle ring 8 comprises a radially extending annular portion defining the radial wall 7, and axially extending inner and outer annular flanges 20 and 21 respectively which extend into an annular cavity 22 provided in the turbine housing 3. With the turbine construction shown in the figures, the majority of the cavity 22 is in fact defined by the bearing housing 16—this is purely a result of the construction of the particular turbocharger to which the invention is in this instance is applied and for the purposes of the present invention no distinction is made between the turbine housing and bearing housing in this regard. The cavity 22 has a radially extending annular opening 23 defined between radially inner and outer annular surfaces 24 and 25. A seal ring 26 is located in an annular groove provided in outer annular surface 25 and bears against the outer annular flange 21 of the nozzle ring 8 to prevent exhaust gas flowing through the turbine via the cavity 22 rather than the inlet passageway 6.

In the embodiment shown an actuator 27 in the form of a stepper motor is operable to control the position of the nozzle ring 8. It does so via an output shaft 28 which is connected to appropriate transmission elements such as gears etc. 29 which in turn are connected to axially extending guide rods 30 (only one of which is visible in the figures) that support the nozzle ring 8 via linking plates 31.

Figure 2:
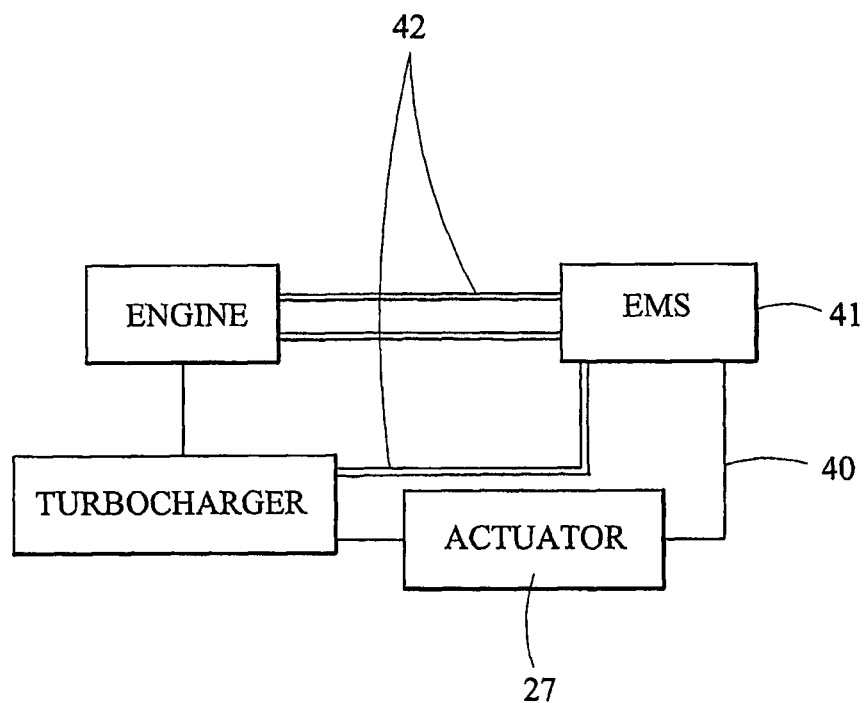
FIG. 2 is a block diagram illustrating a control system of a variable geometry turbine that forms part of a turbocharger of an internal combustion engine.

As can be seen from FIG. 2 the actuator 27 is controlled by electrical control signals 40 generated by a microprocessor that is part of the engine management system (EMS) 41, in response to feedback signals 42 representing parameters of the engine performance and the current position of the nozzle ring 8. The measured parameters are compared with the desired parameters and the difference is used to generate a control signal that determines the displacement of the moveable element of the variable geometry turbine. The control signal operates the actuator (the motor in this case) so that the axial position of the guide rods 30 and thus of the nozzle ring 8 can be selectively positioned. FIG. 1 shows the nozzle ring 8 in its fully open position in which the inlet passageway 6 is at its maximum width.

It is to be understood that the nature of the connection of the actuator to the nozzle ring is not important for the purposes of the present invention. The actuator is ideally an electric motor but could be any other type of electrically controlled actuator where current consumption is a problem (e.g. a solenoid). It will be appreciated by the skilled person that certain actuators such as stepper motors lend themselves better to accurate positional control. Another example of an electrical actuator is a linear motor as described in our European Patent Application EP-A-1426580.

When events such as fault conditions occur within an internal combustion engine it is desirable to gather information about the event to aid in later diagnosis of faults. Additionally, it is desirable to gather information about routine events such as, for example the ignition circuit being turned on, as this information may shed further light on the cause of faults. By providing this information within a relative time frame, such that the time intervals between events can be calculated the process of diagnosing faults can be greatly simplified. It is not always convenient to provide this relative time frame by having an input to the event logging device from an external clock.

It is particularly desirable to be able to diagnose fault conditions occurring in the operation of an actuator operating within a variable geometry turbine. This is because, as discussed above in the preamble, accurate control of the actuator can result in more efficient operation of the turbine, and therefore the whole turbocharger and engine.

Figure 3:
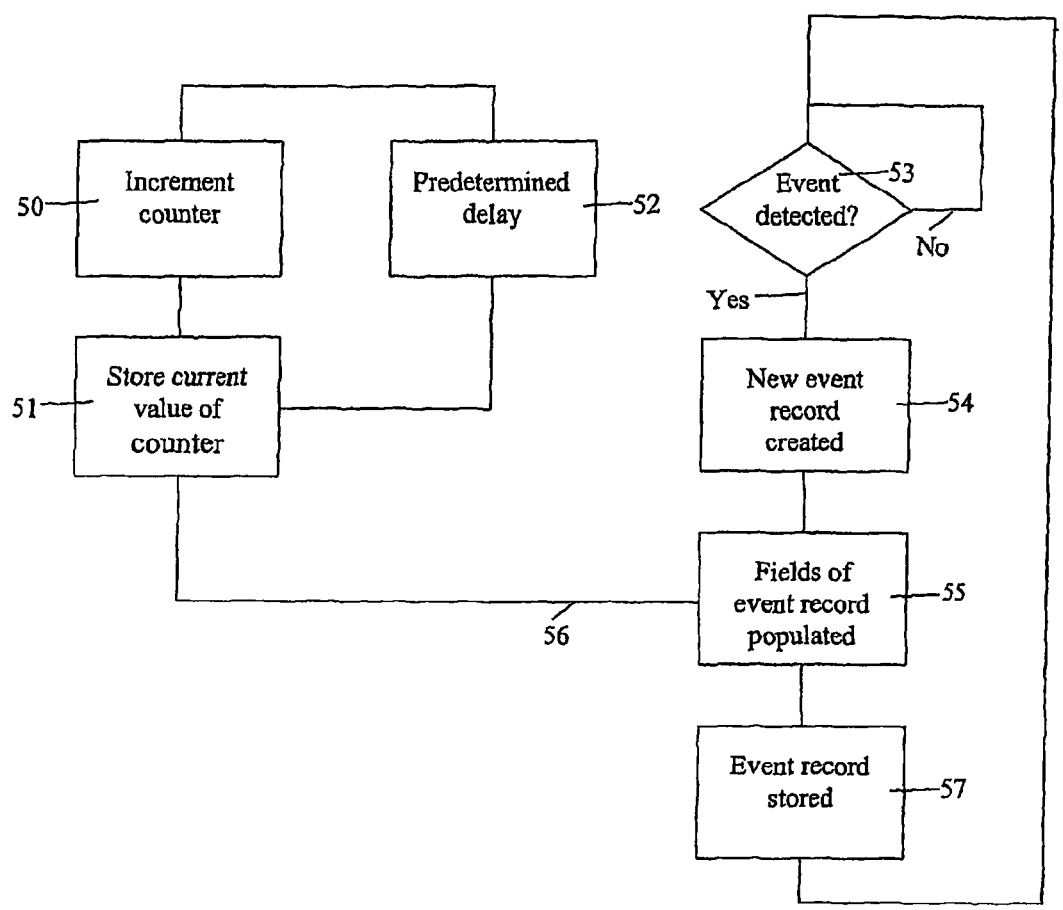
FIG. 3 is a flow chart schematically representing the operation of an embodiment of the present invention.

Referring now to FIG. 3 this schematically represents, in the form of a flow chart, the operation of an event logging device in accordance with an embodiment of the present invention. This may be used to log information about events occurring within an internal combustion engine. This may, in particular, be used to log information about events occurring in the operation of an actuator.

The control system is only operational while power is being supplied (i.e. when the ignition circuit is switched on). Outside of this time it is incapable of any activity. While power is being supplied, a counter is periodically incremented (step 50). The current value of the counter is stored in non-volatile memory (step 51) such that when the power supply is switched off the last value of the counter is saved until the power supply is resumed. The counter then waits for a predetermined period (step 52) before incrementing the counter again. The predetermined period is typically one second, such that the relative timing of logged events can be calculated to an accuracy of +/−one second. The non-volatile memory can be, for instance, EEPROM. The amount of memory provided for storing the current value of the counter will determine the length of time the counter can count up to. Four bytes would allow up to 136 years of events to be recorded at if each predetermined period were one second.

The predetermined period between updating the counter may vary from one second. For instance the period may be a fraction of a second, for instance 0.1 s or 0.01 s, or the period may be multiple seconds, for instance 10 s or 100 s. The period that is chosen will depend on the size of the memory provided for storing the counter value, the expected frequency of events, the expected maximum duration for which events are to be logged and the required resolution of relative timings of events. The counter will typically be incremented by one each time. However, the counter could be incremented by more than one.

Step 53 represents an event being detected. If an event is detected the operation passes to step 54. If an event is not detected the operation remains at step 53. Events may be detected by receiving signals from sensors including feedback sensors connected to an actuator, the turbine, the turbocharger or any other part of an internal combustion engine. The nature of the events detected is variable and can be configured to detect events particularly relevant for the type of engine to which the device is fitted. It can include, for instance, an ignition circuit being switched on, an actuator failing to reach its desired position, a time-out on a communications channel within the engine, excess current being drawn by a component, the failure of a Hall sensor for detecting the position of an actuator and the failure of the engine.

A new event record is created (step 54). An event record comprises an area of memory reserved in a memory device. The area of memory is of fixed length, and has a number of fixed length fields. These fields are then populated with information characterising the event (step 55). One of the fields is the current value of the counter, (input 56 to step 55).

When later analysing event records the relative time since the last event may be calculated by subtracting the counter value stored in the preceding event record from the current value of the counter and multiplying by the known length of the predetermined delay. Other fields within each event record can include, for instance, an event type field, a status field relating to the status of the particular part of the engine, e.g. the actuator that is being monitored, actuator temperature and actuator position. Each field is typically a whole multiple of bytes long, see for example Table 1.

TABLE 1

Sample format of an event record. The total event record is nine bytes long.

| Byte | Description | Format | Comments |
|---|---|---|---|
| 1 | Event type | 0-255 | Each type of event is given a code from 0 (ignition switched on) to 255. |
| 2 | Status | 0-255 | Status code |
| 3 | Temperature | 0-255 | One degree Celsius per bit giving a recordable range from −55° C. to +200° C. |
| 4-5 | Actuator position | 0-1000 | 0.1% of full range of motion of actuator per bit. |
| 6-9 | Current value of counter | 0-4294967295 | Incremented at a rate of once per second while power is supplied |

Once all of the fields within a new event record have been populated with information the event record is stored in a memory device (step 57). This memory device may be the same memory device as that used to store the current value of the counter. The process then reverts to step 53 to wait for the next event to be detected. Meanwhile, the counter continuously increments while power is supplied to the control system. Power is supplied during the period for which the ignition of the engine is switched on. This does not necessarily correspond to the period for which the engine is running.

When the ignition is first switched on an event is logged. This provides a reference point in time for any subsequent events. Therefore, for each event, the time since the ignition was switched on can be calculated.

The memory to which new event records are written comprises a circular array. The memory comprises a circular pointer, arranged to point to the next sequential location for an event record. Once the end of the array has been reached new event records are stored at the beginning of the array overwriting the oldest event records. The memory is arranged to have a sufficiently large storage capacity that event records will not be overwritten until a sufficiently long time has elapsed (for instance one year) such that the information about events they contain is no longer of value for diagnosing current faults.

The entire contents of the memory can be downloaded to a computer or other external processor for off line analysis. By analysing event records it is possible to discern periods during which the event logging device was powered. By implication, an approximate indication of the length of time for which the control system was not powered, i.e. the ignition was switched off, can be discerned. In this manner a comprehensive picture can be built up over time of the typical driving patterns of the vehicle and the relative times at which critical events occurred. By including temperature and actuator status and position information within the event records an indication of the prevailing conditions at the time logged events occurred can be established. Table 2 gives a representative indication of a series of event records downloaded from the memory store.

TABLE 2

Representative sample of a series of event records and calculated session and period times.

| Event Type | Temp (° C.) | Status | Position | Counter Value | Period | Session |
|---|---|---|---|---|---|---|
| 0 - Ignition on | 7 | 0 | 31 | 103925 | | |
| 1 - Failed to reach desired position | 105 | 2 | 36 | 104895 | 00:16:10 | |
| 2 - Communications time out | 86 | 1 | 82 | 105631 | 00:28:26 | |
| 1 - Failed to reach desired position | 47 | 0 | 41 | 112934 | 02:30:09 | |
| | | | | | | 2:43:18 |
| 0 - Ignition on | 22 | 0 | 43 | 113723 | | |
| 3 - Excess current | 126 | 3 | 51 | 129074 | 04:15:51 | |
| 4 - Hall sensor failure | 142 | 2 | 22 | 250108 | 37:51:35 | |
| | | | | | | 38:30:58 |
| 0 - Ignition on | 7 | 0 | 31 | 252381 | | |
| 5 - Engine failure | 33 | 3 | 99 | 261623 | 02:34:02 | |
| | | | | | | 04:23:11 |
| 0 - Ignition on | 15 | 0 | 52 | 268172 | | |

The current value of the counter is effectively frozen when the power is switched off, i.e. the ignition is switched off. Therefore, the final value of the counter when the ignition is switched off is equal to the value of the counter when the ignition is next switched on. A session is the time from the previous ignition on event, i.e. the start of the current period of engine use, to the current event. This can be calculated in hours minutes and seconds from the difference between the counter values. A period is the length of time for which the engine is switched on. This is calculated by subtracting the counter values from one ignition on event to the next. By examining the event records contained within a period the precise time of any event relative to the time the ignition was switched on and when the ignition is switched off can be determined.

It is not possible to tell directly from the event records the duration of time between periods in which power was supplied to the control system—i.e. the periods during which the ignition circuit was switched off. However, from the other fields within event records some assumptions can be made, which provide a fuller picture of the typical usage patterns of the engine. As engine temperature tends to increase with the length of time the ignition is switched on, and then fall away after the ignition is switched off, ignition on events with low temperatures are likely to indicate the vehicle being used after a long time has elapsed since the vehicle was last used, e.g. the vehicle being used first thing in the morning. Conversely an ignition on event with a high temperature is likely to indicate a relatively short duration since the last time the vehicle was used. If an engine on period with a cold initial temperature is typically followed by an engine on period with a warm initial temperature this is likely to indicate an average driving pattern of two sessions of driving per day. By subtracting the lengths of a pair of periods from 24 hours the length of time in the day for which the ignition was switched off can be determined. From this, an indication of the typical usage of the vehicle can be built up.

For fault diagnosis, the following valuable information can be determined by analysing the event records: How long the ignition had been on before the event occurred, the relative timing of subsequent events, the length of time the ignition was on while the engine (or one specific, part e.g. an actuator) was damaged and the total period for which the ignition was switched on. By analysing the temperature information it is possible to estimate the temperature at the time a fault occurs, whether the ignition is switched off for a short duration of time, whether excess heat is a typical factor at the time faults occur and whether faults could be caused by blockages due to freezing.

It will be readily appreciated by the appropriately skilled person that the event logging device and method of the present invention may be applied to other devices for which it is desirable to log the occurrence of events, in particular critical events for later analysis of faults. For example, the event logging may be applied to other aspects of the operation of a vehicle powered by an internal combustion engine. More generally, the present invention may be applied to any machine, system or device for which it is desirable to log events within an estimated time frame where no time reference signal is available.

It is to be appreciated that numerous modifications and variations may be made to the above described design and methods without departing from the scope of the invention as defined in the appended claims.

The invention claimed is:

1. A method of logging information about events for an internal combustion engine having an ignition circuit, the method comprising the steps of:
   continuously incrementing a current value of a counter at a predetermined rate only when the ignition circuit is turned on;
   detecting that an event has occurred;
   creating a new event record having at least two fields;
   populating the fields within the new event record with information about the event, including at least event type and the current value of the counter; and
   storing the new event record.

2. A method according to claim 1, further comprising the step of storing the current value of the counter in a counter memory device.

3. A method according to claim 2, wherein the memory device comprises a non-volatile memory device such that the stored contents of the or each memory device are not erased if a power supply to the or each memory device is disconnected.

4. A method according to claim 3, wherein the event record memory device has a finite capacity to receive new event records, the method further comprising the step of overwriting an oldest event record with the new event record once the finite capacity of the event record memory device is exceeded.

5. A method according to claim 3, further comprising the step of using a pointer in the event record memory device to point to the next sequential position after the new event record, for storing the next event record.

6. A method according to claim 1, further comprising the step of storing each event record in an event record memory device.

7. A method according to claim 6, wherein the event record memory device has a finite capacity to receive new event records, the method further comprising the step of overwriting an oldest event record with the new event record once the finite capacity of the event record memory device is exceeded.

8. A method according to claim 6, further comprising the step of using a pointer in the event record memory device to point to the next sequential position after the new event records, for storing the next event record.

9. A method according to claim 6, wherein the or each memory device comprises a non-volatile memory device such that the stored contents of the or each memory device are not erased if a power supply to the or each memory device is disconnected.

10. A method according to claim 1, wherein the internal combustion engine comprises a turbocharger with a variable geometry turbine, the turbine being driven by exhaust gas delivery to the turbine inlet passage from an internal combustion engine exhaust manifold.

11. A method according to claim 10, wherein the turbine uses a selectively moveable element to vary the geometry of an inlet passage of the turbine, the moveable element being displaceable by an actuator in response to electrical control signals.

12. A method according to claim 11, wherein the actuator is an electrical actuator.

13. A method according to claim 11, wherein each event record has further fields and the step of populating the fields further comprises populating the further fields with information about the event selected from a group including engine status, actuator temperature and actuator position.

14. A method according to claim 1, wherein the event is selected from a group including an ignition circuit turning on, failure of an actuator to reach a desired position, excess current drawn by an actuator, failure of a Hall sensor within a turbine and failure of the internal combustion engine.

15. An internal combustion engine comprising an engine management control system that is configured to perform the method of claim 1.

16. An internal combustion engine comprising an engine management control system, wherein the engine management control system comprises a microprocessor that controls the implementation of the method of claim 1.

17. An internal combustion engine comprising an engine management control system, wherein the method according to claim 1 is implemented via a computer program stored in the engine management system.

18. An event logging device for an internal combustion engine having an ignition circuit, the event logging system comprising:
   a counter arranged to continuously increment at a predetermined rate only when the ignition circuit is turned on;
   means for detecting that an event has occurred;
   means for creating a new event record having at least two fields; and
   a memory for storing the new event record,
   wherein the event locking device is configured to populate the fields within the new event record with information about the event, including at least event type and the current value of the counter.

19. An event logging device according to claim 18, wherein the device is arranged to store the current value of the counter in a counter memory device.

20. An event logging device according to claim 19, wherein the memory device comprises a non-volatile memory device such that the stored contents of the or each memory device are not erased if a power supply to the or each memory device is disconnected.

21. An event logging device according to claim 19, wherein the device is arranged to store each event record in an event record memory device.

22. An event logging device according to claim 21, wherein the or each memory device comprises a non-volatile memory device such that the stored contents of the or each memory device are not erased if a power supply to the or each memory device is disconnected.

23. An event logging device according to claim 18, wherein the device is arranged to store each event record in an event record memory device.

24. An event logging device according to claim 23, wherein the event record memory device has a finite capacity to receive new event records, and is arranged to overwrite an oldest event record with the new event record once the finite capacity of the event record memory device is exceeded.

25. An event logging device according to claim 23, wherein the device is arranged to provide a pointer in the event record memory device to point to the next sequential position after the new event record, for storing the next event record.

26. An event logging device according to claim 18, wherein the internal combustion engine comprises a turbocharger with a variable geometry turbine, the turbine being driven by exhaust gas delivery to the turbine inlet passage from an internal combustion engine exhaust manifold.

27. An event logging device according to claim 26, wherein the turbine uses a selectively moveable element to vary the geometry of an inlet passage of the turbine, the moveable element being displaceable by an actuator in response to electrical control signals.

28. An event logging device according to claim 27, wherein the actuator is an electrical actuator.

29. An event logging device according to claim 18, wherein each event record has further fields and the device is arranged to populate the further fields with information about the event selected from a group including engine status, actuator temperature and actuator position.

30. An event logging device according to claim 18, wherein the event is selected from a group including an ignition circuit turning on, failure of an actuator to reach a desired position, excess current drawn by an actuator, failure of a Hall sensor within a turbine and failure of the internal combustion engine.

31. A powered vehicle having an internal combustion engine, comprising an event logging device according to claim 18.

32. An internal combustion engine having an engine management control system, the engine management control system including the event logging device according to claim 18.

33. The internal combustion engine according to claim 32, wherein the engine management control system comprises a microprocessor.

* * * * *

UNITED STATES PATENT AND TRADEMARK OFFICE
CERTIFICATE OF CORRECTION

| | | |
|---|---|---|
| PATENT NO. | : 8,473,149 B2 | |
| APPLICATION NO. | : 11/901464 | |
| DATED | : June 25, 2013 | |
| INVENTOR(S) | : Calvin Cox | |

It is certified that error appears in the above-identified patent and that said Letters Patent is hereby corrected as shown below:

In the Claims

- Column 11, Claim 18, Line 10, please delete "event locking device" and insert --event logging device--.

Signed and Sealed this
Eleventh Day of March, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,473,149 B2 | Page 1 of 1 |
| APPLICATION NO. | : 11/901464 | |
| DATED | : June 25, 2013 | |
| INVENTOR(S) | : Calvin Cox | |

It is certified that error appears in the above-identified patent and that said Letters Patent is hereby corrected as shown below:

In the Claims

- Column 11, Claim 18, Line 12, please delete "event locking device" and insert --event logging device--.

This certificate supersedes the Certificate of Correction issued March 11, 2014.

Signed and Sealed this
First Day of April, 2014

Michelle K. Lee
*Deputy Director of the United States Patent and Trademark Office*